United States Patent [19]

Okada

[11] Patent Number: 5,729,486
[45] Date of Patent: Mar. 17, 1998

[54] DIGITAL DIVIDING APPARATUS USING A LOOK-UP TABLE

[75] Inventor: Hidefumi Okada, Daito, Japan

[73] Assignee: Sanyo Electric Co., Ltd., Osaka, Japan

[21] Appl. No.: 525,982

[22] Filed: Sep. 8, 1995

[30] Foreign Application Priority Data

Sep. 13, 1994 [JP] Japan ................... 6-219059

[51] Int. Cl.$^6$ ........................................... G06F 7/52
[52] U.S. Cl. ........................................... 364/764
[58] Field of Search ........................ 364/764, 761, 364/736

[56] References Cited

U.S. PATENT DOCUMENTS 3,917,935  11/1975  Lazecki .......................... 364/761
5,020,017   5/1991  Ooms et al. ..................... 364/761
5,339,267   8/1994  Ito ............................... 364/761

FOREIGN PATENT DOCUMENTS 9012361  10/1990  WIPO.

OTHER PUBLICATIONS

K.K. Maass, "Alignment of Operands Before and After 2–Bit Divide Loop", IBM Technical Disclosure Bulletin, vol. 23, No. 1, Jun. 1980, 249–251.

D.D. Sarma et al., "Measuring the Accuracy of ROM Reciprocal Tables", IEEE Computer Society/IEEE Technical Committee on VLSI, 11th Symposium on Computer Arithmetic, Jun. 29–Jul. 2, 1993, Windsor, Ontario, Canada, 95–102.

*EPO Communication dated Dec. 15, 1995 also supplied.
*European Search Report also supplied.

Primary Examiner—David H. Malzahn
Attorney, Agent, or Firm—Michaelson & Wallace; Peter L. Michaelson

[57] ABSTRACT

The digital dividing apparatus includes a comparator for comprising a first input signal A with a second input signal B; a selector responsive to an output from the comparator for selecting a larger one out of the first and the second input signals; a priority encoder for outputting a priority signal in which only a bit corresponding to the most significant bit out of bits having a value of "1" of the selected input signal is set to a value "1"; a bit difference encoder responsive to the priority signal for producing a bit difference between the most significant bit of the selected input signal and the most significant bit out of bits having a value of "1" of the selected input signal; a first shifter for shifting the first input signal A to an upper side by the bit difference; a second shifter for shifting the second input signal B to an upper side by the bit difference; a first round-down circuit for rounding down lower bits of the signal shifted by the first shifter to produce a first m-bit round-down signal $\alpha$; a second round-down circuit for rounding down lower bits of the signal shifted by the second shifter to produce a second n-bit round-down signal $\beta$; a LUT memory for pro-storing a look-up table; and an LUT control circuit for controlling the LUT memory.

4 Claims, 5 Drawing Sheets

FIG. 3(a) INPUT SIGNAL A    31 | 0 | 0 | 0 | 0 | 0 | 1 | 1 | 1 | 1 | 1 |

FIG. 3(b) INPUT SIGNAL B    15 | 0 | 0 | 0 | 0 | 0 | 0 | 1 | 1 | 1 | 1 |

FIG. 3(c) OUTPUT OF SELECTOR 4    31 | 0 | 0 | 0 | 0 | 0 | 1 | 1 | 1 | 1 | 1 |

FIG. 3(d) OUTPUT OF PRIORITY ENCODER 5    | 0 | 0 | 0 | 0 | 0 | 1 | 0 | 0 | 0 | 0 |
                          0  1  2  3  4  5  6  7  8  9  BIT DIFFERENCE K

FIG. 3(e) OUTPUT OF BIT DIFFERENCE ENCODER 6    5 | 0 | 1 | 0 | 1 |

FIG. 3(f) OUTPUT OF SHIFTER 7    992 | 1 | 1 | 1 | 1 | 1 | 0 | 0 | 0 | 0 | 0 |

FIG. 3(g) OUTPUT OF SHIFTER 8    480 | 0 | 1 | 1 | 1 | 1 | 0 | 0 | 0 | 0 | 0 |

FIG. 3(h) OUTPUT OF ROUND DOWN CIRCUIT 9    15 | 1 | 1 | 1 | 1 |

FIG. 3(i) OUTPUT OF ROUND DOWN CIRCUIT 10    7 | 0 | 1 | 1 | 1 |

FIG. 3(j) ADDRESS OF LUT 11    | 1 | 1 | 1 | 1 | 0 | 1 | 1 | 1 |

FIG. 3(k) OUTPUT OF LUT 11    40 | 0 | 0 | 1 | 0 | 1 | 0 | 0 | 0 |

FIG. 5(a)  INPUT SIGNAL A

FIG. 5(b)  INPUT SIGNAL B

FIG. 5(c)  OUTPUT OF BIT WIDTH SUPPLEMENTING CIRCUIT 30

DIGITAL DIVIDING APPARATUS USING A LOOK-UP TABLE

BACKGROUND OF THE INVENTION

1. Field of the Invention

The present invention relates to a digital dividing apparatus using a look-up table, and more particularly, to an apparatus for calculating a ratio of one digital input signal to a sum of two digital input signals.

2. Description of the Background Art

In electronic apparatuses such as a video camera and a video tape recorder, signals like a video signal and an audio signal have been conventionally processed by an analog circuit in an analog manner. In recent years, however, such analog signal processing is increasingly being replaced with a technique of converting signals into a digital form and processing them in a digital manner.

A digital signal processing circuit which performs such a signal processing as described above is often required to calculate a ratio of one input signal to the sum of two digital input signals. For calculation of such a ratio, a dividing apparatus 52 including an adder 50 and a divider 51 as illustrated in FIG. 1, for example, is used. Adder 50 calculates the sum of input signals A and B, and divider 51 divides input signal B by sum calculated by adder 50. As a result, dividing apparatus 52 outputs a value of B/(A+B). Such a dividing apparatus 52 needs to perform its operation every time input signals A and B are supplied, and therefore, it requires a significant amount of time to perform these operations, resulting in long delays for signals to pass through dividing apparatus 52.

For an increased operating speed and simplification of such a signal processing circuit, a method of substituting a look-up table (hereinafter referred to as "LUT") for a function of a conventional dividing apparatus 52 is possible.

This LUT is constituted by addresses corresponding to every possible value of each of input signals A and B and ratios of B/(A+B) calculated for each value of input signals A and B. The LUT is pre-stored in a LUT memory. This LUT enables a ratio of B/(A+B) to be read from the memory in response to input signals A and B without actually calculating the ratio.

The ratio of B/(A+B) calculated by dividing apparatus 52 of FIG. 1 is, of course, "1" or less. In digital calculation, however, decimal parts will not be used as they are. An output signal of dividing apparatus 52 is converted so that a prescribed value of the output signal indicates "1, and decimal parts of the output signal are rounded down. For an 8-bit output signal, for example, a value of the output signal can be in the range from the minimum value "0" to a prescribed value "128 (=$2^7$)". If all the bits of the output signal are "0", the output signal has the minimum value "0". If only a most significant bit (MSB) of the output signal is "1", the output signal has the above-mentioned prescribed value "128".

Accordingly, a digital dividing apparatus for calculating such a ratio as described above outputs digital quotient data C given by the following equation (1) where "ins" indicates that decimal parts of a value in the subsequent parentheses are rounded down, and W represents the number of bits (bit width) of an output signal. When both input signals, i.e., A and B, are "0", data C is $2^{w-2}$, $$C = int\left(\frac{B}{A=B} \times 2^{w-1}\right) \quad (1)$$

The LUT includes digital quotient data C defined by the above equation (1) corresponding to addresses representing input signals A and B. Assuming that each of input signals A and B has 10 bits, for example, the LUT requires $2^{20}$ (=$2^{10} \times 2^{10}$) addresses. In addition, assuming that an output signal is 8 bits, memory capacity for each data C. Therefore, in order to store such an LUT in a memory, a memory having a capacity of $2^{20}$ bytes, that is, 1 Mbyte is required.

As described above, in the method using an LUT in a circuit for calculating a ratio of one input signal to the sun of two input signals, it is necessary that one address be applied for each combination of possible values of both input signals, and data of that ratio be prepared for that address. For a p-bit input signal A and a q-bit input signal B. for example, $2^{p+q}$ addresses are required in order to prepare data for all the ratios which may be calculated. Therefore, the number of bits of each of input signals A and B increases, the number of addresses required for a memory also increases substantially. As a result, memory capacity as well as a circuit scale might increase.

In order to suppress the increase in the required memory capacity and reduce the circuit scale for the LUT, a method of rounding down lower bits of each of input signals A and B is possible. If both input signals A and B are small, however, lower bits thereof are rounded down although they are very important. Therefore, the ratio obtained by such an LUT is significantly different from the ratio that would be actually calculated; hence resulting operation error might be extremely large, as a result.

SUMMARY OF THE INVENTION

It is an object of the present invention to provide a digital dividing apparatus capable of operating at high speed.

It is another object of the present invention to provide a digital dividing apparatus having a small circuit scale.

It is a further object of the present invention to provide a digital dividing apparatus that produces a small error.

According to the present invention, a digital dividing apparatus responsive to a first M-bit digital input signal A and a second N-bit digital input signal B (where each of M and N is a positive integer) for producing a digital output signal for B/(A+B) includes a first multiplying circuit, a second multiplying circuit, a first round-down circuit, a second round-down circuit, a look-up table storage circuit, and a control circuit. The first multiplying circuit multiplies the first digital input signal A by $2^K$, where K is a positive integer. The second multiplying circuit multiplies the second digital input signal B by $2^K$. The first round-down circuit rounds down at least one bit of a first digital product signal A×$2^K$ output from the first multiplying circuit and produces a first m-bit digital round-down signal a where m is a positive integer smaller than M. The second round-down circuit rounds down at least one bit of a second digital product signal B×$2^K$ output from the second multiplying circuit and produces a second n-bit digital round-down signal β, where n is a positive integer smaller than N. The look-up table storage circuit pre-stores a look-up table. The look-up table includes $2^{m+n}$ digital quotient data for β/(α+β) corresponding to $2^{m+n}$ combinations of $2^m$ possible values of the first digital round-down signal α and $2^n$ possible values of the second digital round-down signal β. The control circuit is responsive to the first digital round-down signal α from the first round-down circuit and the second digital round-down signal β from the second round-down circuit, and controls the look-up table storage circuit so that corresponding one of $2^{m+n}$ digital quotient data is read as a digital output signal.

Since this digital dividing apparatus includes the look-up table storage circuit and calculates the ratio of B/(A+B) using a look-up table stored therein, calculation speed thereof increases. This digital dividing apparatus further includes the first and the second round-down circuits by which lower bits of the first and the second input signals A and B are rounded down, respectively, and therefore, a scale of the look-up table storage circuit is reduced. The digital dividing apparatus further includes the first and the second multiplying circuits which multiplies the first and the second digital input signals A and B by $2^K$ before rounding down the first and the second digital input signals A and B, respectively; hence, operation error thereof is reduced as a result.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3(a)–3(k) are diagrams illustrating an operation of the digital dividing apparatus shown in FIG. 2.

FIGS. 5(a)–5(c) are diagrams illustrating an operation specific to the digital dividing apparatus shown in FIG. 4.

DESCRIPTION OF THE PREFERRED EMBODIMENTS

Embodiments of the present invention will now be described in detail in conjunction with the accompanying drawings. A like or a corresponding portion in the figures is indicated by a like reference, and description thereof will not be repeated.

[FIRST EMODIMENT]

Figure 1:
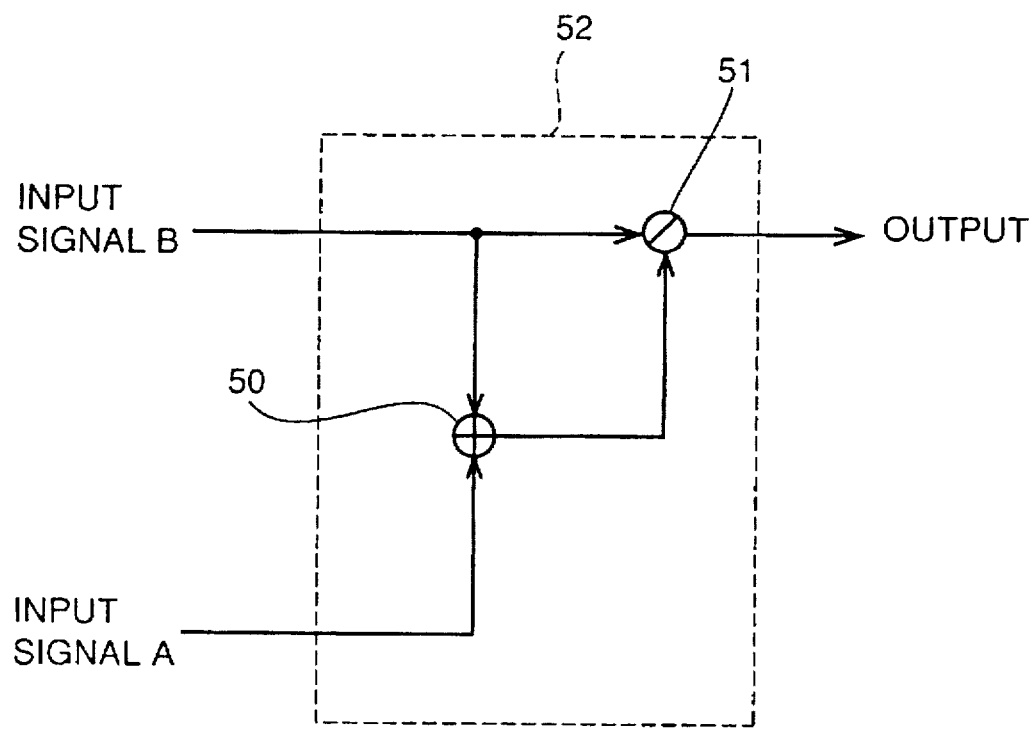
FIG. 1 is a block diagram showing a conventional apparatus for calculating a ratio of B/(A+B).
Figure 2:
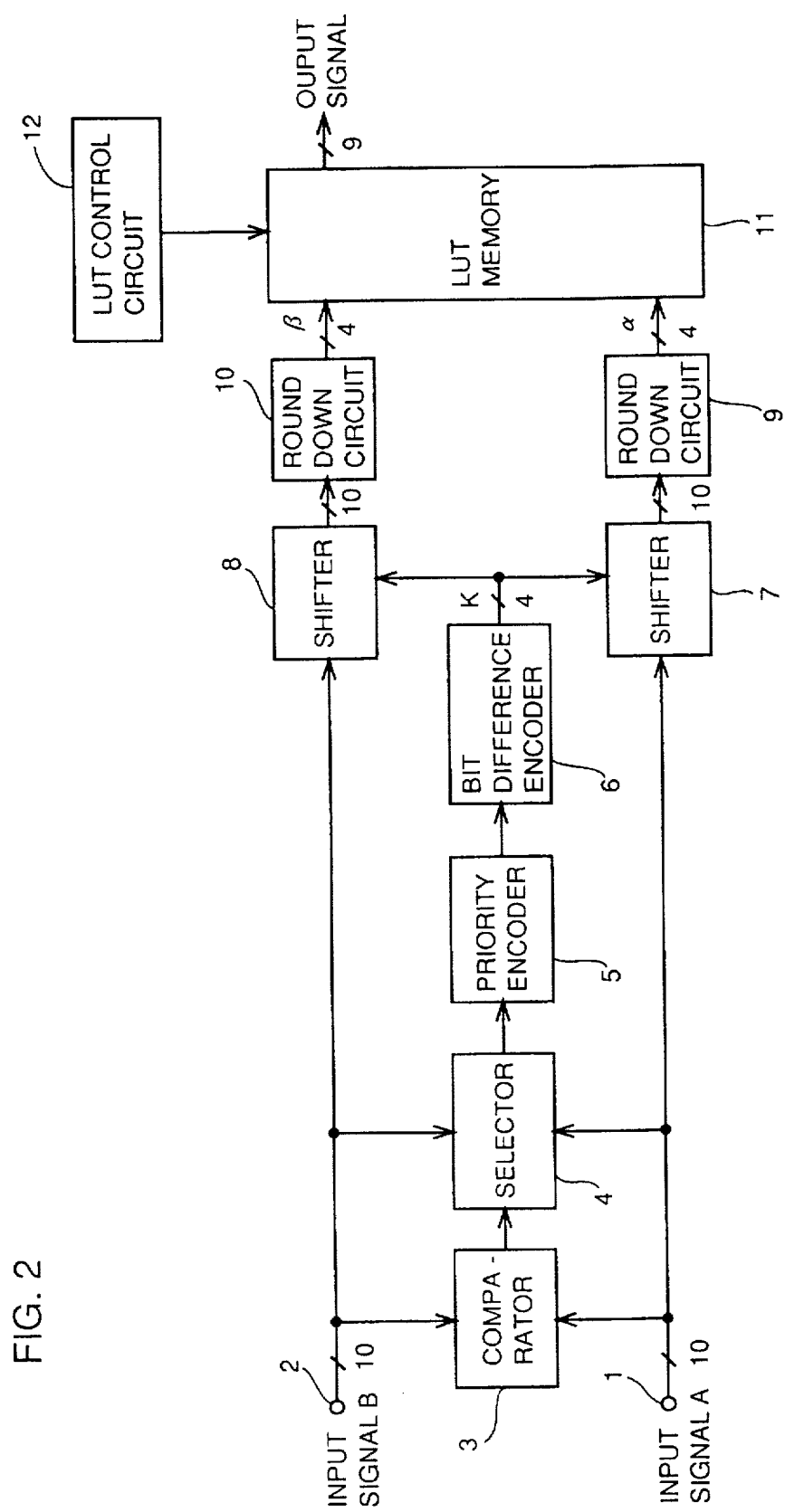
FIG. 2 is a block diagram showing an entire arrangement of a digital dividing apparatus in accordance with a first embodiment of the present invention.

Referring to FIG. 2, a digital dividing apparatus includes an input terminal 1 for one bus and an input terminal 2 for another bus. A 10-bit digital input signal A is supplied to input terminal 1. Another 10-bit digital input signal B is supplied to input terminal 2. The digital dividing apparatus further includes a comparator 3 for receiving input signals A and B and comparing input signal A with input signal B; a selector 4 responsive to an output from comparator 3 for selecting a larger input signal out of input signals A and B; a priority encoder 5 for receiving the input signal selected by selector 4 and outputting a digital priority signal in which only a bit corresponding to a most significant bit out of those bits which have a value of "1" of the selected input signal is itself set to "1"; a bit difference encoder 6 responsive to the digital priority signal output from priority encoder 5 for outputting a bit difference K between the most significant bit (MSB) of the selected input signal and the most significant bit out of bits indicating "1" of the selected input signal; a shifter 7 for shifting each bit of input signal A to an upper side thereof (i.e., left) by the bit different K; a shifter 8 for shifting each bit of input signal B to an upper side thereof (i.e., left) by the bit difference K; a round-down circuit 9 for rounding down lower 6 bits of input signal A shifted by shifter 7 and producing a 4-bit digital round-down signal α; a round-down circuit 10 for rounding down lower 6 bits of input signal B shifted by shifter 8 and producing a 4-bit digital round-down signal β; and look-up table (LUT) memory 11 for pre-storing a LUT; and an LUT control circuit 12 responsive to digital round-down signals α and β for controlling LUT memory 11.

The LUT has 256 addresses corresponding to 256 combinations of 16 ($=2^4$) possible values of a digital round-down signal α and 16 possible values of a digital round-down signal β. The LUT further includes 256 8-bit digital quotient data C for β/(α+β) corresponding to 256 addresses. LUT memory 11 is controlled by LUT control circuit 12, whereby one of 256 digital quotient data C described above is read as a digital output signal.

Each address of LUT memory 11 is constituted by 8 bits. Upper 4 bits of each address correspond to the digital round-down signal α, and lower 4 bits thereof correspond to the digital round-down signal β. Since both digital round-down signals α and β can have $2^4$ values, LUT memory 11 requires 256 ($=2^4 \times 2^4$) addresses.

Digital quotient data C for β/(α+β) is calculated with the following equation (2) for every possible value of each of the digital round-down signals α and β, and each of the calculated data C is pre-stored at a corresponding address in the LUT.

$$C = int\left(\frac{\beta}{\alpha+\beta} \times 2^{w-1}\right) \quad (2)$$

Where W is the number of bits of an output signal. In this case, the number of bits of the output signal is "8", and therefore, W=8. In using this equation (2), A and B are simply replaced with α and β, respectively, since the digital dividing apparatus converts input signals A and B into round-down signals α and β, respectively, and calculates the ratio of β/(α+β) based on the converted round-down signals α and β.

A operation of the digital dividing apparatus shown in FIG. 2 will now be described with reference to FIG. 3. For simplification of description, it is here assumed that a specific value "31" is applied as input signal A and a specific value "15" is applied as input signal B. FIG. 3(a) is a 10-bit digital input signal A having a value of "31". FIG. 3(b) is a 10-bit digital input signal B having a value of "15".

Comparator 3 compares input signal A with input signal B, and determines which input signal is larger. In this case, since input signal A is larger than input signal B, comparator 3 supplies selector 4 with the result showing input signal A is larger than input signal B. Selector 4 receives the result, the selects the larger input signal A as shown in FIG. 3(c) for supply to priority encoder 5.

Priority encoder 5 produces a priority signal as shown in FIG. 3(d) in response to the input signal supplied from selector 4. The priority signal has 10 bits as input signals A and B. One bit out of 10 bits in the priority signal indicates "1". This bit indicating "1" corresponds, in bit position, to the position of the most significant bit out of the bits indicating "1" of input signal A supplied from selector 4. In this case, since upper 5 bits (in bit positions 0–4) of input signal A are "0" and lower 5 bits (in bit positions 5–9) thereof are "1", the sixth bit (in bit position 5) from the most significant bit (MSB) of input signal A is the most significant bit out of all the bits in this signal indicating "1". Accordingly, as shown in FIG. 3(d), only the sixth bit from the most significant bit of the priority signal indicates "1". Such a priority signal is supplied to bit difference encoder 6.

Bit difference K=0, 1, 2, ... , 9 (measured in bit positions) from the most significant bit is shown in FIG. 3(e), under the 10-bit priority signal of FIG. 3(d). In this priority signal, the sixth bit from the most significant bit indicates "1"; and therefore, the bit difference K, measured in bit positions, between the bit position of the most significant bit (MSB) in, e.g., input signal A and the bit position of the most significant bit out of the bits indicating "1" in, e.g., input signal A is "5".

Since bit difference encoder 6 converts the bit difference K into a 4-bit signal, a 4-bit digital signal indicating the bit difference K of "5" as shown in FIG. 3(e) is supplied to each of shifters 7 and 8.

Shifter 7 once holds the 10-bit input signal A, and then, shifts each bit of the held 10-bit input signal A to the upper side by the bit difference K supplied from bit difference encoder 6. In this case, input signal A as shown in FIG. 3(a) is shifted to the upper side (i.e., left) by 5 bits, and therefore, a 10-bit signal as shown in FIG. 3(f) is supplied to round-down circuit 9. Shifter 8 once holds the 10-bit input signal B, and then, shifts each bit of the held input signal B to the upper side (i.e., left) by the bit difference K supplied from bit difference encoder 6. In this case, input signal B as shown in FIG. 3(b) is shifted to the upper side by 5 bits, and therefore, a 10-bit signal as shown in FIG. 5(g) is supplied to round-down circuit 10. In both shifters 7 and 8, "0" are inserted into lower bits of the signal resulting from the shift. More specifically, "0" bits which were on the upper side prior to the shift are moved to the lower side. Accordingly, input signal A is converted from "31" into "992", while input signal B is converted form "15" into "480".

In other words, shifter 7 multiplies input signal A by $2^K$, and shifter 8 multiples input signal B by $2^K$. In this case, input signal A of "31" is multiplied by 32 (=$2^5$), and input signal B of "15" is multiplied by 32. If input signal A of "31" is multiplied by a value larger than "32", for example 64 (=$2^6$), the resultant product cannot be represented by a 10-bit signal. Accordingly, comparator 3, selector 4, priority encoder 5, and bit difference encoder 6 determine the bit difference K so that shifters 7 and 8 will not cause overflow of input signals A and B, respectively. In addition, the bit difference K determined is the maximum within the range which does not cause overflow of input signals A and B.

Now, the manner through which the processing as described above affects equation (1) will be described. If each of a denominator and a numerator of B/(A+B) in the equation (1) is multiplied by $2^K$, the following equation (3) is obtained. The example described above corresponds to the case of K=5.

$$C = int\left( \frac{B \cdot 2^K}{A \cdot 2^K + B \cdot 2^K} \times 2^{n-1} \right) \quad (3)$$

As a matter of course, if a fraction in this equation (3) is reduced to its lowest terms, the equation (3) returns to the original equation (1). Accordingly, even if each of input signals A and B is multiplied by a constant before being supplied to LUT memory 11, the ratio of B/(A+B) will not change. As a result, even if each of input signals A and B is shifted by 5 bits as described above, that is, each of input signals A and B is multiplied by $2^5$, the resultant ratio will not change at all.

Input signals A and B each shifted to the side of upper bits within the range which does not cause overflow thereof are applied to round-down circuits 9 and 10, respectively. Round-down circuit 9 rounds down lower 6 bits of the shifted input signal A. Therefore, a 4-bit digital round-down signal α as shown in FIG. 3(h) is applied from round-down circuit 9 to LUT memory 11. On the other hand, round-down circuit 10 rounds down lower 6 bits of the shifted input signal B. Therefore, a 4-bit digital round-down signal β as shown in FIG. 3(i) applied from round-down circuit 10 to LUT memory 11. In this case, round-down signal α is "15" and round-down signal β is "7".

A LUT prepared in advance has been stored in LUT memory 11. In this LUT, 8-bit digital quotient data C have been calculated according to the equation (2) for every possible value of each of two round-down signals α and β. LUT control circuit 12 applies round-down signals α and β to LUT memory 11 as an address, and reads digital quotient data C based on the applied address. This read quotient data C is output from LUT memory 11 as an 8-bit output signal. In this case, "15" is applied to LUT memory 11 as round-down signal α, and "7" is applied to LUT memory 11 as round-down signal β; and therefore, LUT control circuit 12 accesses an address as shown in FIG. 3(j). Quotient data C (=40) obtained by the equation (2) has been stored in this address. As a result, digital quotient data indicating "40" as shown in FIG. 3(k) is read from LUT memory 11 as a digital output signal.

Since a 10-bit output signal of each of shifters 7 and 8 is reduced to 4-bits, capacity of LUT memory It for the LUT can be reduced. If each of two input signals applied to LUT memory 11 is 10 bits and an output signal of LUT memory 11 is 8 bits as described above, LUT memory 11 requires $2^{20}$ byte capacity. In the present embodiment, however, lower 6 bits of each of input signals A and B are rounded down, and therefore, $2^8$ (=$2^4 \times 2^4$) byte capacity is sufficient for LUT memory 11 even though an output signal of LUT memory 11 is 8-bits as in the case described above. If comparator 3, selector 4, priority encoder 5, bit difference encoder 6, shifters 7 and 8, and round-down circuits 9 and 10 are not provided, 10-bit input signals A and B are applied directly to LUT memory 11. Therefore, LUT memory 11 requires $2^{20}$ byte capacity. In this case, LUT memory 11 is provided with addresses of 10-bit input signals A and B, and digital quotient data C calculated according to the equation (1) would be pre-stored in respective addresses. Accordingly, if input signal A of "31" and input signal B of "15" are applied to the LUT memory, for example, data C of "41" would be read as an output signal.

As described above, if lower bits of each of input signals A and B are not rounded down, an output signal of "41" is obtained, whereas if lower bits of each of input signals A and B are rounded down as in the present embodiment, an output signal of "40" is obtained. Accordingly, an output signal calculated by the present embodiment has an error of only "1". This is because shifters 7 and 8 shift input signals A and B to the upper side of bits as much as possible within the range which does not cause overflow, respectively.

On the other hand, if comparator 3, selector 4, priority encoder 5, bit difference encoder 6, and shifters 7 and 8 are not provided, the lower 6 bits of each of input signals A and B are simply rounded down, and the resultant 4-bit round-down signal is applied to LUT memory 11. Capacity of LUT memory 11 can be reduced to a small amount also by such a simple round-down method as in the case of the present embodiment. However, if input signal A of "31" and input signal B of "15" are applied directly to round-down circuits 9 and 10, respectively, for example, lower 6 bits of each of inputs signals A and B are simply rounded down, and therefore, two round-down signals α and β applied from round-down circuits 9 and 10 to LUT memory 11, respectively, are "0". As a result, an output signal "64" is read from LUT memory 11 according to the equation (2). Since a precise value of an output signal at this time "41", this output signal has an extremely large error. Accordingly, only simple rounding down of lower bits of an input signal results in a large error in an output signal, if a value of the input signal is small.

The following table shows errors of the above-described simple round-down method and errors of the present embodiment obtained by experiment.

|  | maximum error | mean square error |
|---|---|---|
| simple round down method | 64 | 34 |
| present embodiment | 15 | 8 |

This table shows errors calculated based on a value obtained when 10-bit input signals A and B are applied directly to the LUT memory and an 8-bit output signal is read from the LUT memory. More specifically, a value of each of input signals A and B was varied sequentially from "0" through "1023", and quotient data C for every possible value of each of input signals A and B were calculated according to the equation (1). Corresponding quotient data C were also calculated by the above-described simple round-down method. Furthermore, corresponding quotient data were also calculated by the present embodiment. Then, errors were calculated for every possible value of each of input signals A and B, based on the quotient data obtained as described above. The above table shows the maximum error obtained by the simple round-down method and the maximum error obtained by the present embodiment. In addition, each error obtained by each of the simple round-down method and the present embodiment was squared, and mean square error was calculated for each of the simple round-down method and the present embodiment. As can be seen from the above table, the present embodiment can substantially suppress the error compared to the simple round-down method.

[SECOND EMBODIMENT]

Figure 4:
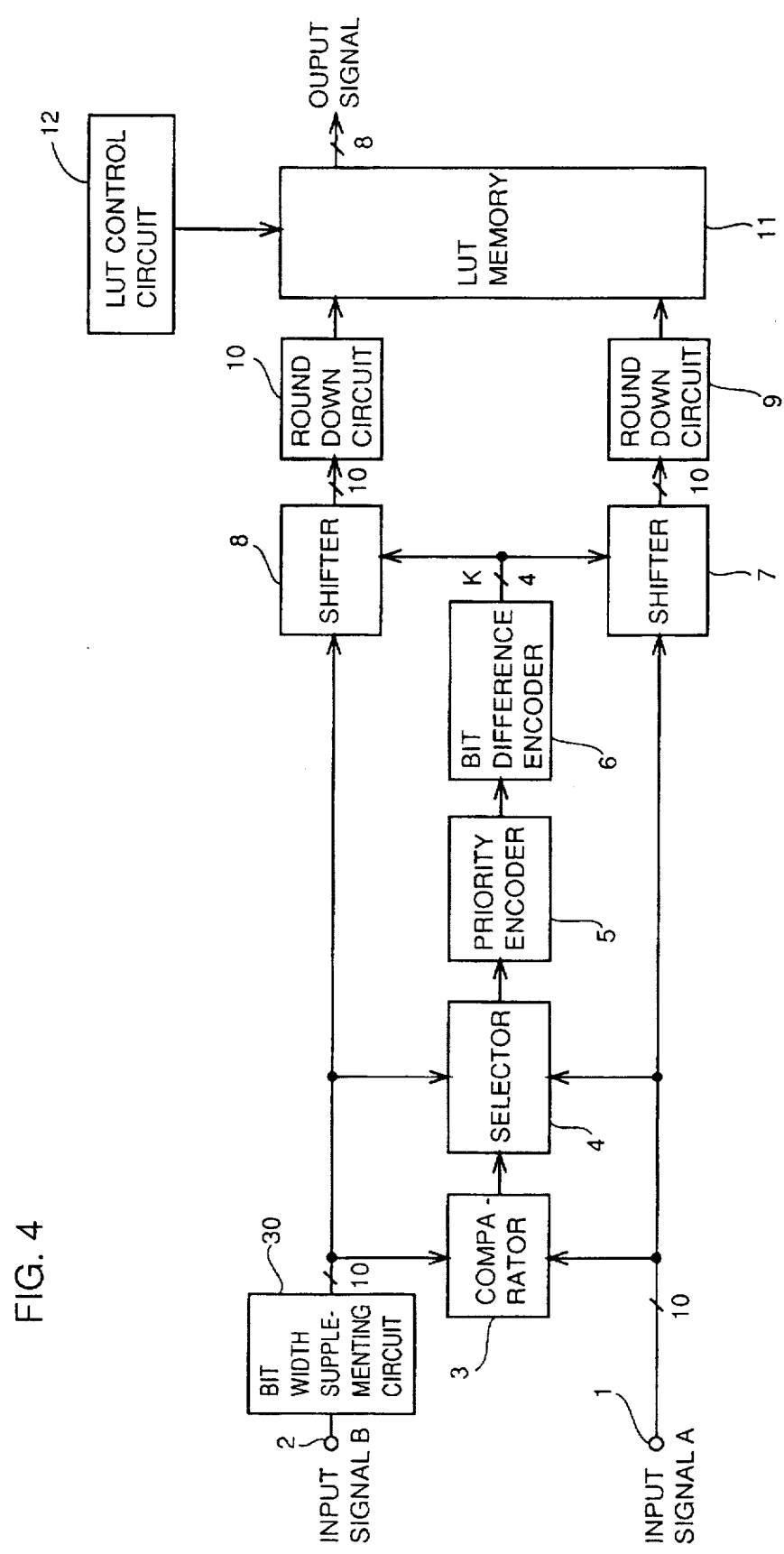
FIG. 4 is a block diagram showing an entire arrangement of a digital dividing apparatus in accordance with a second embodiment of the present invention.

Although the number of bits of input signal A is the same as that of input signal B in the above-mentioned first embodiment, the apparatus shown in FIG. 2 cannot deal with input signals each having different number of bits. A second embodiment shown in FIG. 4 is provided to deal with such a case. The second embodiment will now be described with reference to FIG. 4, and a like or a corresponding portion to FIG. 2 is indicated by a like reference and description thereof will not be repeated.

Referring to FIG. 4, the digital dividing apparatus is different from the apparatus shown in FIG. 2 only in that a bit width supplementing circuit 30 is added to the side of an input terminal 2. In the present embodiment, a 10-bit input signal A is supplied to an input terminal 1, and an 8-bit input signal B is supplied to input terminal 2. Bit width supplementing circuit 30 is provided only on the side to which input signal B having smaller number of bits is supplied. Accordingly, 8-bit input signal B is applied to bit width supplementing circuit 30 before being applied to a shifter 8. In this bit width supplementing circuit 30, 2 bits indicating "0" are added to the upper side of bits of the applied 8-bit input signal B.

If 8-bit input signal B of "15" as shown in FIG. 5(b) is applied to bit width supplementing circuit 30, for example, 2 bits are added to the upper side of bits of the applied input signal B as shown in FIG. 5(c). These added 2 bits are set to "0". Therefore, 8-bit input signal B is converted into a 10-bit signal by bit width supplementing circuit 30 without change of the value. An output signal of bit width supplementing circuit 30 shown in FIG. 5(c) is the same as the signal shown in FIG. 3(b). Accordingly, subsequent operation of the second embodiment is similar to the operation of the above-mentioned first embodiment shown in FIG. 2.

[OTHER EMBODIMENTS]

The number of bits rounded down by each of round-down circuits 9 and 10 in the first and the second embodiments is not limited to 6, and round-down circuits 9 and 10 may be constituted to round down lower 7 bits of an input signal, for example. In this case, although calculation error produced in an output signal of LUT memory 11 is increased, capacity required for LUT memory 11 is reduced. On the contrary, if round-down circuits 9 and 10 are constituted to round down lower 5 bits of an input signal, capacity required for the LUT memory is increased, whereas an error produced in an output signal of LUT memory 11 is reduced.

Although both round-down circuits 9 and 10 round down the same number of bits in the first and the second embodiments, they may round down different number of bits from each other. For example, round-down circuit 9 may round down lower 6 bits of an input signal A, and round-down circuit 10 may round down lower 5 bits of an input signal B. In this case, a 4-bit round-down signal is applied from round-down circuit 9 to LUT memory 11, while a 5-bit round-down signal is applied from round-down circuit 10 to LUT memory 11, and therefore, an LUT corresponding to such round-down signals must be prestored in LUT memory 11. More specifically, quotient data for every possible value of each of the 4-bit round-down signal and the 5 bit round-down signal must be precalculated.

Although a 4-bit round-down signal $\alpha$ is applied as an upper address of LUT memory 11 and a 4-bit round-down signal $\beta$ is applied as a lower address of LUT memory 11 in the first and the second embodiments, a round-down signal $\alpha$ may be applied as a lower address and a round-down signal $\beta$ may be applied as an upper address.

Although the number of bits of an input signal B is smaller than that of an input signal A in the second embodiment, a bit width supplementing circuit may be added to the side of an input terminal 1 to which an input signal A is supplied if the number of bits of input signal A is smaller than that of input signal B.

Although the present invention has been described and illustrated in detail, it is clearly understood that the same is by way of illustration and example only and is not to be taken by way of limitation, the spirit and scope of the present invention being limited only by the terms of the appended claims.

I claim:

1. A digital dividing apparatus responsive to a first M-bit digital input signal A and a second N-bit digital input signal B, where M and N are positive integers and M is greater than N, for producing a digital output signal of B/(A+B), comprising:

first multiplying means for multiplying said first digital input signal A by $2^K$, where K is a positive integer;

second multiplying means for multiplying said second digital input signal B by said $2^K$;

first round-down means for rounding down at least one predetermined lower bit of a first digital product signal $A \times 2^K$ generated by said first multiplying means to produce a first m-bit digital round-down signal $\alpha$, where m is a positive integer smaller than said M;

second round-down means for rounding down at least one predetermined lower bit of a second digital product signal $B \times 2^K$ generated by said second multiplying means to produce a second n-bit digital round-down signal $\beta$, where n is a positive integer smaller than said N;

look-up table storage means for storing a look up table having $2^{m+n}$ digital quotient data for $\beta/(\alpha+\beta)$ corresponding to $2^{m+n}$ combinations of $2^m$ possible values of said first digital round-down signal $\alpha$ and $2^n$ possible values of said second digital round-down signal $\beta$;

supplementing means for supplementing an upper side of said second digital input signal B with at least one bit set to a value of "0" such that the number of bits N of said second digital input signal equals the number of bits M of said first digital input signal; and control means responsive to said first and second digital round-down signals $\alpha$ and $\beta$ for controlling said look-up table storage means to read therefrom a corresponding one of said $2^{m+n}$ digital quotient data as said digital output signal.

2. A digital dividing apparatus responsive to a first M-bit digital input signal A and a second N-bit digital input signal B, where M and N are positive integers and M is greater than N, for producing a digital output signal of B/(A+B), comprising:

first multiplying means for multiplying said first digital input signal A by $2^K$, where K is a positive integer;

second multiplying means for multiplying said second digital input signal B by said $2^K$;

first round-down means for rounding down at least one predetermined lower bit of a first digital product signal $A \times 2^K$ generated by said first multiplying means to produce a first m-bit digital round-down signal $\alpha$, where m is a positive integer smaller than said M;

second round-down means for rounding down at least one predetermined lower bit of a second digital product signal $B \times 2^K$ generated by said second multiplying means to produce a second n-bit digital round-down signal $\beta$, where n is a positive integer smaller than said N;

look-up table storage means for pre-storing a look up table including $2^{m+n}$ digital quotient data for $\beta/(\alpha+\beta)$ corresponding to $2^{m+n}$ combinations of $2^m$ possible values of said first digital round-down signal $\alpha$ and $2^n$ possible values of said second digital round-down signal $\beta$;

supplementing means for supplementing an upper side of said first digital input signal A with at least one bit set to a value of "0" such that the number of bits M of said first digital input signal equals the number of bits N of said second digital input signal; and control means responsive to said first and second digital round-down signals $\alpha$ and $\beta$ for controlling said look-up table storage means to read therefrom a corresponding one of said $2^{m+n}$ digital quotient data as said digital output signal.

3. A digital dividing apparatus responsive to a first M bit digital input signal A and a second N bit digital input signal B, where each of M and N is a positive integer, for producing a digital output signal for B/(A+B), comprising:

selecting means for selecting a larger one of said first and second digital input signals so as to define a selected digital input signal; said selecting means having:
a comparator for comparing said first input signal A with said second input signal B; and
a selector responsive to an output from said comparator for selecting the larger digital input signal from the first and second input signals A and B, respectively, as the selected digital input signal;

detecting means for detecting a bit difference between a bit position of a most significant bit of the selected digital input signal and a bit position of a most significant bit out of bits having a value of "1" of said selected digital input signal;

first shifting means for shifting each bit of said first digital input signal A to an upper side thereof by said bit difference so as to form a shifted first digital input signal;

second shifting means for shifting each bit of said second digital input signal B to an upper side thereof by said bit difference so as to produce a shifted second digital input signal;

first round-down means for rounding down at least one bit of said shifted first digital input signal to produce a first m-bit digital round-down signal $\alpha$, where m is a positive integer smaller than said M;

second round down means for rounding down at least one bit of said shifted second digital input signal to produce a second n-bit digital round-down signal $\beta$, where n is positive integer smaller than said N;

look-up table storage means for storing a look-up table having $2^{m+n}$ digital quotient data for $\beta/(\alpha+\beta)$, corresponding to $2^{m+n}$ combinations of $2^m$ possible values of said first digital round-down signal $\alpha$ and $2^n$ possible values of said second digital round-down signal $\beta$; and control means responsive to said first and second digital round-down signals $\alpha$ and $\beta$, respectively, for controlling said look-up table storage means to read a corresponding one of said $2^{m+n}$ digital quotient data as said digital output signal.

4. The digital dividing apparatus according to claim 3, wherein said detecting means comprises:

a priority encoder for generating a digital priority signal in which only a bit corresponding to a most significant bit out of bits having a value of "1" of said selected digital input signal is set to a value of "1"; and a bit difference encoder responsive to said digital priority signal for producing said bit difference.

* * * * *